Nov. 8, 1938.    A. D. BEYER    2,135,998
MEANS FOR NOURISHING PLANTS
Filed April 6, 1937
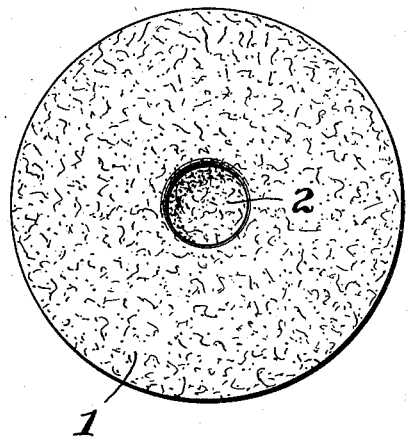
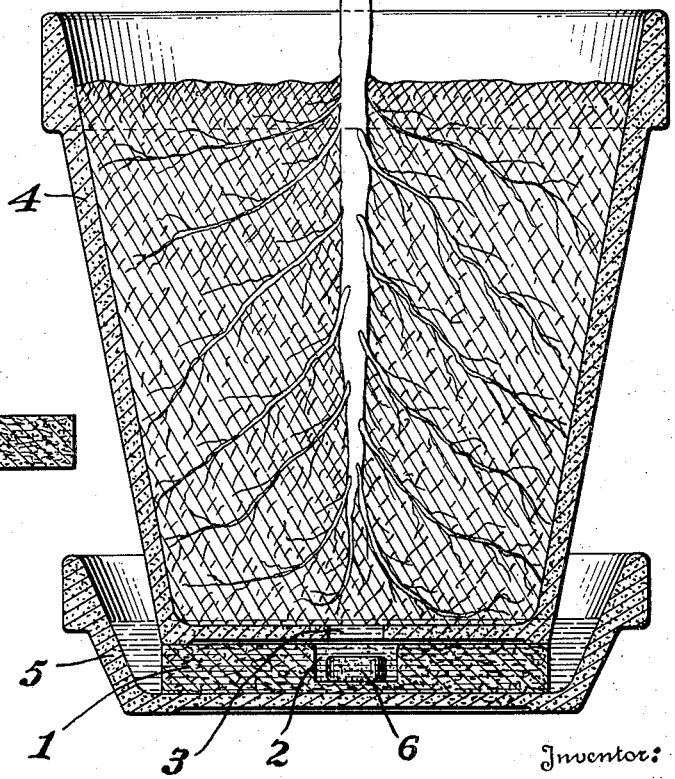
Inventor:
Alvin D. Beyer,
By Spear, Donaldson & Hall
Attorneys.

Patented Nov. 8, 1938

2,135,998

UNITED STATES PATENT OFFICE 2,135,998

MEANS FOR NOURISHING PLANTS

Alvin D. Beyer, Norristown, Pa.

Application April 6, 1937, Serial No. 135,316

8 Claims. (Cl. 47—38)

The invention is an improvement in devices for supplying plants with nourishment.

An object of the invention is to provide simple means of novel construction to effectively supply plants with water and food.

The invention consists in the features and combination of parts as described hereinafter.

In the drawing

Figure 1 is a plan view of the porous pad of my invention.

Fig. 2 is a sectional view of the same on line 2—2 of Fig. 1.

Fig. 3 shows the porous pad in place in the dish receiving the same and containing liquid to be supplied to the plant contained in the flower pot supported by the pad.

Referring to the drawing, I designates the porous pad of my invention which may be of any suitable material of a porous nature such that the water or other liquid will be absorbed by the pad and will seep through the pad in being taken up by the plant.

A recess 2 having a closed bottom is formed in the upper surface of the pad, the recess being adapted to receive solid material in the form of plant food which will be in communication with the hole 3 in the bottom of the flower pot or the like 4, so that the liquid may pass through the plant food in supplying nourishment to the plant.

A dish 5 receives the porous pad and contains the liquid which is to be absorbed by the pad and supplied through the plant food to the earth in the flower pot, and thence to the plant.

The pad of porous material may be of disc shape as shown or of other desired shape, and may be made in different sizes depending on the size of the bottom of the flower pot. Also, the recess in the porous pad for receiving the plant food would be of a size in proportion to the amount of food required for feeding the plant.

The solid material or plant food in the recess 2 may be of any suitable form and in the use of the device as shown in the drawing comprises a pellet or tablet 6 of plant food.

In the use of the device as shown, the water is mantained at such level in the dish and covering the pad, that, after passing through the porous pad, it will rise to such level in the recess 2 as to contact the earth in the bottom of the pot 4 through the hole 3, and thus nourish the plant with water containing the plant food.

In another manner of use, earth or other solid material capable of a capillary effect may be placed in the recess, overlying the plant food, and contacting the earth in the pot through the hole in the bottom of the pot, so as to transmit the liquid containing the plant food from the recess in the porous pad to the plant. In this use of the device, the liquid in the dish need only be at a level to cover the sides of the porous pad.

The porous pad should preferably be soaked in water to saturate the same before using it.

The porous pad may be made in two portions, an upper portion having an opening therethrough, and a lower portion comprising a solid disc closing the opening and thus forming the bottom of the recess. The two portions are cemented together with waterproof cement, or fastened together by any suitable means. As shown in the drawing, the porous pad desirably may be of fibrous material.

I claim:

1. In a device of the class described, a porous pad of a size and shape to encompass the bottom of a flower pot or the like with which it is to be used, said porous pad having a substantially centrally disposed recess in its upper surface and having a ledge around said recess providing a support for the flower pot or the like.

2. In a device of the class described, a porous pad of a size and shape to encompass the bottom of a flower pot or the like with which it is to be used, said porous pad having a solid bottom and having a substantially centrally disposed recess in its upper surface extending part way through said pad toward the bottom thereof, said pad having a ledge around said recess providing a support for the flower pot or the like.

3. A device according to claim 2 in which said recess extends through the major portion of the thickness of the pad to a point near the bottom of the pad, and is adapted to receive solid material.

4. In a device of the class described, a porous pad of fibrous material of a size and shape to encompass the bottom of a flower pot or the like with which it is to be used, said fibrous pad having a substantially centrally disposed recess in its upper surface and having a ledge around said recess providing a support for the flower pot or the like.

5. In a device of the class described, a porous pad of fibrous material of a size and shape to encompass the bottom of a flower pot or the like, with which it is to be used, said fibrous pad having a solid bottom and having a substantially centrally disposed recess in its upper surface extending part way through said pad toward the bottom thereof, said pad having a ledge around said recess providing a support for the flower pot or the like.

6. A device according to claim 2 in which said pad comprises an upper portion and a lower portion secured together, the upper portion having a central opening therethrough, and the lower portion being solid and closing the lower end of the opening to provide the bottom of said recess.

7. In a structure for use with a flower pot or the like containing earth or other solid material and having an opening in its bottom, a porous supporting member therefor having a solid bottom and having a recess in its upper surface disposed substantially in registry with the opening in the pot and extending part way through said member toward the bottom thereof to receive and support material in communication with the earth or solid material in the pot to be absorbed thereby.

8. A porous supporting member according to claim 7, said porous member being of fibrous material.

ALVIN D. BEYER.